(12) United States Patent
Schlimmer et al.

(10) Patent No.: US 7,571,441 B2
(45) Date of Patent: Aug. 4, 2009

(54) EFFICIENT RETRIEVAL OF INFORMATION FROM A NETWORK SERVICE USING SOAP

(75) Inventors: Jeffrey C. Schlimmer, Redmond, WA (US); Donald F. Box, Bellevue, WA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/086,136

(22) Filed: Mar. 22, 2005

(65) Prior Publication Data

US 2006/0230164 A1 Oct. 12, 2006

(51) Int. Cl.
G06F 13/00 (2006.01)
(52) U.S. Cl. ................ 719/313; 719/315; 709/217; 709/218; 709/219
(58) Field of Classification Search ............. 719/313, 719/315; 709/217, 218, 219
See application file for complete search history.

(56) References Cited

U.S. PATENT DOCUMENTS

| 7,117,504 | B2 * | 10/2006 | Smith et al. ............... 719/328 |
| 2005/0044197 | A1 * | 2/2005 | Lai ............................ 709/223 |
| 2005/0182843 | A1 * | 8/2005 | Reistad et al. ............. 709/230 |
| 2006/0089987 | A1 * | 4/2006 | Igarashi et al. ............. 709/225 |

OTHER PUBLICATIONS

W3C: URIs, Addressability, and the use of HTTP GET and POST [online] Mar. 21, 2004 [retrieved Mar. 1, 2005]. Retrieved from the Internet: pp. 1 through 12.
Article entitled "Web Service Retrieval Validation (WS-ETag)," dated Nov. 2004, by Jeffrey Schlimmer, pp. 1 through 9.
Article entitled "Web Service Enumeration (WS-Enumeration)," dated Nov. 2004, by Jan Alexander et al., pp. 1 through 12.
Article entitled "Web Service Retrieval (WS-Get)," dated Nov. 2004, by Don Box et al., pp. 1 through 10.

* cited by examiner

*Primary Examiner*—Andy Ho
(74) *Attorney, Agent, or Firm*—Workman Nydegger (57) ABSTRACT

Information can be retrieved by a requesting computer system from a responding computer system using a SOAP-based get operation. In one implementation, a requesting computer system identifies an endpoint reference for content at a responding computer system. The requesting computer system then creates a SOAP get message for retrieving the content, where the message can include one or more constraints for receiving the content, and sends the message to the responding computer system using any appropriate transport protocol. The responding computer system receives the message, determines an extent to which the content can be provided, and creates a response message that relates to the first message. In one implementation, the reply can include an error message, at least a portion of the content, and, in some cases, another endpoint reference for retrieving the rest of the requested content.

20 Claims, 4 Drawing Sheets

EFFICIENT RETRIEVAL OF INFORMATION FROM A NETWORK SERVICE USING SOAP

CROSS-REFERENCE TO RELATED APPLICATIONS

N/A

BACKGROUND OF THE INVENTION

1. The Field of the Invention

This invention relates to systems, methods, and computer program products for efficiently retrieving information from a network service using SOAP-based algorithms.

2. Background and Relevant Art

As computerized systems have increased in popularity, so also have the needs to distribute information on computer systems in networks both large and small. In general, computer systems and related devices communicate information over a network for a variety of reasons, whether, for example, to simply exchange personal electronic messages, to sell merchandise, provide account information, and so forth. One will appreciate, however, that as computer systems and their related applications have become increasingly more sophisticated, the challenges associated with sharing data and resources on a network have also increased.

For example, when a user accesses content from a web service (e.g., application at a web server) using a conventional web browser, the user typically does so by typing a Universal Resource Identifier ("URI") into an address portion of the browser, or by clicking on a hyperlink to the content that is found in a different Internet web page. The web browser, in turn, will implement one or more functions over an appropriate protocol for accessing content at the URI. For example, in the simple case of an Internet web page, a Hypertext Transfer Protocol ("HTTP") sends the request for content using a "get" command, which has the URI as a parameter (e.g., "GET (URI)"). When the computer system addressed by the URI receives the command, the computer system interprets any other parameters found in the URI, and sends the requested content back to the user, if available. Other computing languages (e.g., XML, etc.) that are layered on top of HTTP typically use the same "Get" command for sending requests.

Unfortunately, there are a number of disadvantages to accessing web content using the conventional Get command through HTTP. For example, one aspect of conventional HTTP is the notion that any reference (e.g., file, application, or other resource) that is to be accessible over a network will typically need to be addressable by a URI, as follows.

http://www.host.com/file.html

Unfortunately, HTTP also has the limitation that all information associated with a certain request is also contained within the URI. For example, a URI for content that is found as the result of a query, or perhaps includes an update parameter, might include the query function calls and related parameters as part of the URI, as follows.

http://www.host.com/dirl/file.html?query-recentinformation.about.artist=xyz Of course, these sorts of URIs can be much longer and much more complicated than the foregoing example(s) depending on the nature of a given request.

For example, a conventional online map service may have a distinct URI for each portion or view of a requested map. The URI is typically very long and complicated, and refers to a separately created map file, which represents a portion of the map for the entire city. In one instance, the server generates each separate map file for a city segment when the user selects the given city. Any time the user requests a higher view, or a closer view, or a more eastern/western or northern/southern view of a particular aspect of the city, the user selects a unique URI for that particular view, which corresponds to a separate map image. As such, an image map for any given city might have tens, hundreds, or thousands of different associated files for a requested city, which are each referenced by a unique URI.

The length or complexity of the URI, however, is only part of the difficulty with present HTTP request algorithms. In particular, despite the amount of information one can place in a URI, the amount, type, or method by which information is received is not very configurable. For example, the HTTP Get algorithm is typically limited to requesting X, and if X is available, the server returns X, regardless of size, amount, or any other limitations. With respect to the online map example, the client application requests a separate URI for each portion of a certain map, and receives all of the map contents found at the respective URI.

In some cases, the user can constrain the HTTP Get request for more granular information, such as requesting all versions of a city block prior to ten years ago. Unfortunately, more specific or granular requests often require ever-more complicated, lengthy URIs that contain the additional parameters used to constrain or enhance the initial HTTP Get message. Furthermore, since the requests are tied to HTTP and not transport-independent, conventional HTTP Get messages are tied to the limitations and disadvantage of HTTP, and cannot therefore benefits provided by other transport protocols.

Accordingly, systems, methods, and computer program products that provide a client computer system with the ability to request information in a highly configurable manner from another computer system on a network would be an advantage in the art. In particular, an advantage in the art can be realized with systems, methods, and computer program products that allow for rich information retrieval using a "Get" function over conventional communication protocols, without necessarily being limited to one or more of the shortcomings of using HTTP. Furthermore, an advantage in the art can be realized with such systems that provide responding computers with the ability to modify how requested information is returned.

BRIEF SUMMARY OF THE INVENTION

The present invention solves one or more of the problems in the prior art with systems, methods, and computer program products configured to allow rich, granular information retrieval over a network using a SOAP-based "Get" function (also referred to herein as "SOAP get"). In particular, implementations of the present invention relate to using the Simple Object Access Protocol ("SOAP") to "Get" information from another computer system on a network over any appropriate communication protocol.

For example, in one implementation of the present invention, a method from the requesting computer perspective involves identifying a first endpoint reference for content to be retrieved from a responding computer system. For example, a user identifies a URI associated with certain content. The method also includes creating a SOAP get message that is addressed to the first endpoint reference. In general, the SOAP get message will include at least a message identifier, a request for the identified content, and one or more parameters for receiving the content. The requesting computer system then sends the SOAP get message to the responding computer system through a transport protocol. The requesting computer system subsequently receives from the responding computer system a SOAP response message that relates to the message identifier of the SOAP, and which may have been sent through the same or different transport protocol, since the SOAP get message is transport-protocol independent.

By contrast, a method in accordance with an implementation of the present invention from the responding computer perspective involves receiving a SOAP get message that is addressed to a first endpoint reference from the requesting computer system. In general, the received SOAP get message will include a message identifier, content to be retrieved, and one or more parameters for the requested content to be retrieved. The responding computer system then determines an extent of the requested content to provide to the requesting computer system. For example, the responding computer system may decide that the request is better handled through iterative responses of one or more content elements, rather than sending all the content at once.

The responding computer system then creates a corresponding SOAP response message that relates to the message identifier of the SOAP get message, and sends to the requesting computer system the SOAP response message through any appropriate transport protocol. The transport protocol may be the same protocol through which the SOAP get message was received, or may be a different transport protocol since the inventive mechanisms are generally transport independent.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products configured to allow rich, granular information retrieval over a network using a SOAP-based "Get" function (also referred to herein as "SOAP get"). In particular, implementations of the present invention relate to using the Simple Object Access Protocol ("SOAP") to "Get" information from another computer system on a network over any appropriate communication protocol.

For example, as will be understood from the present specification and claims, at least one aspect of the invention relates to a requesting computer system creating a SOAP get message that is transport protocol independent, and is highly configurable without necessarily increasing the length or complexity of a corresponding URI in address field of the endpoint reference ("EPR"). A further aspect of the invention relates to a responding computer system creating a SOAP response message that is also highly configurable, and that may or may not contain all of the contents requested in the SOAP get message. For example, the responding computer system can provide only a part of the requested content, and also provide another EPR (e.g., "EPR'") for the rest of the requested content, where appropriate. Additional aspects of the invention relate to, among other things, providing the ability to easily update certain content from prior requests. Accordingly, implementations in accordance with the present invention provide a much more efficient and extensible way to exchange information over a network than otherwise possible.

Figure 1:
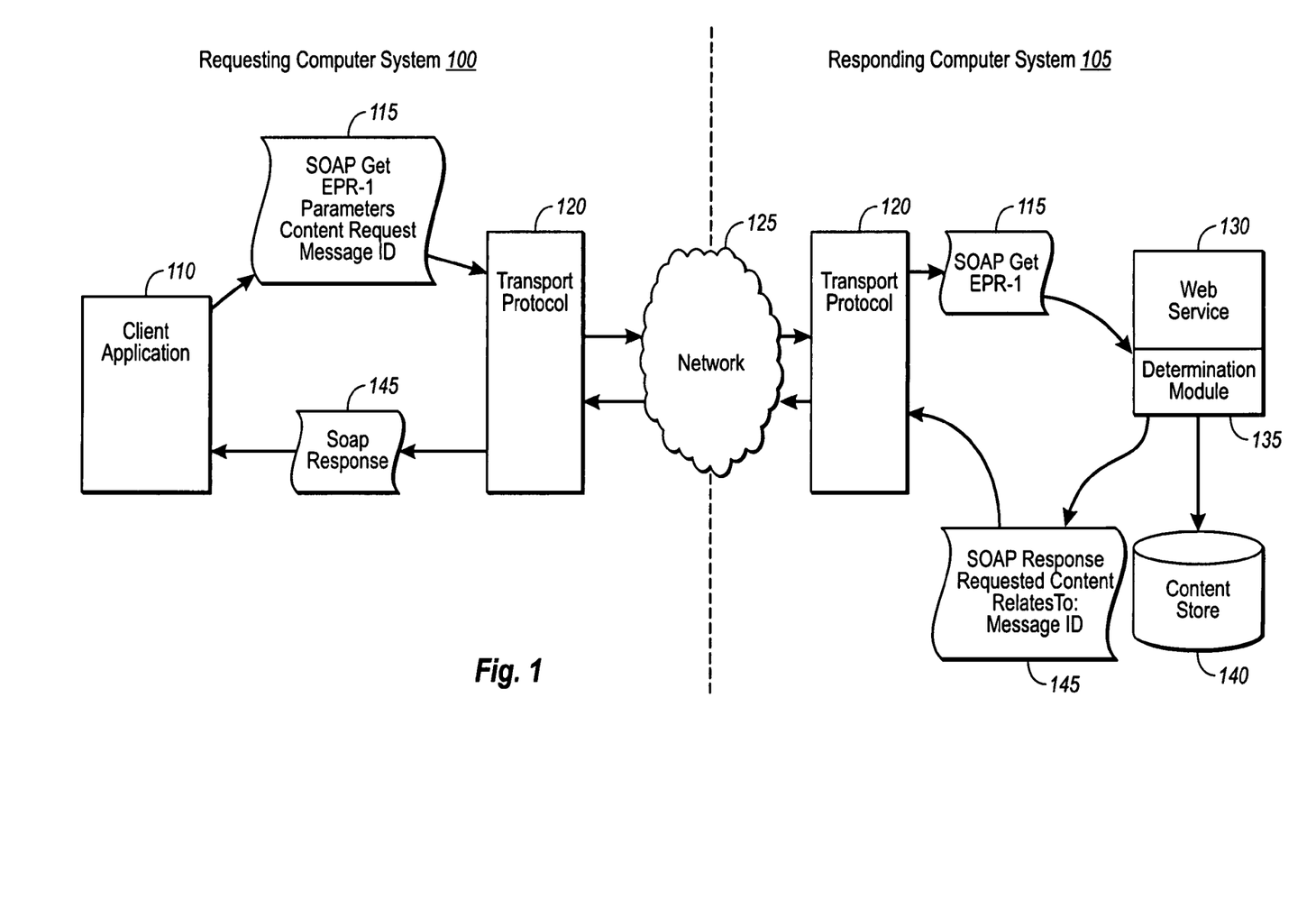
FIG. 1 illustrates a schematic overview of a system in accordance with an implementation of the present invention in which a requesting computer system and responding computer exchange information using SOAP-based get and response messages.

In particular, FIG. 1 illustrates a schematic overview of an implementation of the present invention where a requesting computer system and responding computer exchange information using SOAP-based get and response messages. As shown, FIG. 1 illustrates that a client application 110 creates a SOAP get message 115. The SOAP get message 115 may be created for any number of reasons, such as to retrieve information at web service 130 regarding album titles at a music store database, or to retrieve information regarding the numbers of yellow cars selling for a certain price through the web service 130, and so forth. The retrieved content could then be processed by client application 110, and formatted for viewing through a corresponding user interface, such as a web browser, and so on.

The SOAP get message 115 includes a number of elements, such as a reference for an EPR (i.e., "EPR-1"). In general, an "endpoint reference" (or "EPR") refers to an extensible address in SOAP messaging, which includes at least a Universal Resource Identifier ("URI"). The URI can be a network address, or any other relative or logical path to content, such as file-based content. The EPR can also include one or more parameters in a separate header of the EPR, which defines how the receiving application should deal with the message. The parameters can be specific to an eventual response message, and can also be generalized for additional response messages of a connection session with responding computer system 105.

For example, in the case where SOAP get message 115 is directed to a request for the top selling musical album on a particular chart, an extensible SOAP-based EPR might appear in an XML message as follows.

```
<wsa:EndpointReference
    xmlns:wsa="http://schemas.xmlsoap.org/ws/year/month/
    addressing"
    xmlns:music="http://music.example.com" >
    <wsa:Address>http://music.example.com</wsa:Address>
    <wsa:ReferenceParameters>
    <music:chartName>topAlbum</music:chartName>
    </wsa:ReferenceParameters>
</wsa:EndpointReference>
```

The preceding code example of an endpoint reference shows that the URI for the address simply addresses the host, and places one or more parameter fields (i.e., "ReferenceParameters") in separate elements of the EPR.

FIG. 1 also shows that SOAP get message 115 includes a request for content, and also includes a message identifier, which specifically identifies message 115. The SOAP get message 115 can also include other parameters specific to the content request, which are not necessarily related to those in the EPR portion of message 115. For example, additional parameters might include a refinement of the request to the first five songs found in the album, or to request the producing company for the album, and so on. With reference to the above-example for identifying a "top album", the SOAP envelope might appear as follows:

Since the SOAP get message 115 is transport protocol independent, the SOAP get message 115 can also include constraints that are not ordinarily available in HTTP Get. Such constraints can include "filtering" information (e.g., a maximum number of elements to be included in the body of the SOAP response message 145), "projecting" information (e.g., a pre-specified subset of the information of each element), a constraint not to grow the collection of information being retrieved, or to allow the content to grow only "at the end" of the collection of information being retrieved. Further such constraint headers that can be included in SOAP get message 115, and that are not ordinarily available in HTTP can include a requirement to retrieve only self-consistent collections of information, and to provide the client application 110 with "repeatable reads" of the information being retrieved.

In any event, upon creating SOAP get message 115, client application 105 sends the get 115 through any appropriate transport protocol 120 of an appropriate communication stack. For example, in one implementation, a user executes a request through a web browser for content. The web browser in turn sends SOAP get message 115 through a SOAP communication stack that is layered on top of HTTP. (Sending through HTTP, however, is not required since SOAP is generally protocol independent.) SOAP get message 115 is then passed on to network 125. One or more intermediate nodes on

```
<s:Envelope
    xmlns:s="http://www.w3.org/year/month/soap-envelope"
    xmlns:music="http://music.example.com"
    xmlns:wsa="http://schemas.xmlsoap.org/ws/year/month/addressing" >
    <s:Header>
        <wsa:Action>
        http://schemas.xmlsoap.org/ws/year/month/get/Get/Request
        </wsa:Action>
        <wsa:MessageID>
            uuid:4a1f6794-ca60-4020-ae49-a326d27497ed
        </wsa:MessageID>
        <wsa:To>http://music.example.com</wsa:To>
        <music:chartName>topAlbum</music:chartName>
        <wsa:ReplyTo>
            <wsa:Address>
                http://schemas.xmlsoap.org/ws/year/month/addres
                sing/role/anonymous
            </wsa:Address>
        </wsa:ReplyTo>
    </s:Header>
</s:Envelope>
```

Additional constraints can also be placed on in Get message 115. For example, message 115 can include a requirement that responding computer system 105 understand (i.e., "mustUnderstand='true'") one or more of the parameters of the request before attempting any processing. Accordingly, additional information and parameters for the SOAP get message can be placed in a SOAP envelope of message 115, rather than necessarily in the URI for the requested content.

There are a number of other parameters that can be included in SOAP get message 115 to constrain how the information is retrieved. For example, additional SOAP headers in SOAP get message 115 can include constraints that are also found in HTTP Get, such as the maximum size of information to be retrieved, to retrieve any information available, to retrieve only fresh information, and/or to retrieve only the information that has changed since the last retrieval.

network 125 then resolve the EPR address field of message 115, such that message 115 is also passed ultimately to responding computer system 105 through any appropriate transport 120. As such, FIG. 1 shows that SOAP get message 115 is sent to web service 130 of responding computer system 105.

When receiving message 115, FIG. 1 also shows that web service 130 extracts the contents of get message 115, and implements a determination module 135 to identify how to process the corresponding parameters and requests. For example, web service 130 may not understand message 115, in which case web service would simply respond with an error. In another similar instance, web service 130 may identify that the requested content is not found in any file in content store 140, and so might also return an error.

Alternatively, determination module 135 recognizes the request in message 115, identifies the requested-for content in content store 140, and further determines that it can fulfill the request, or that it can only fulfill the request within certain parameters. For example, with respect to a request for a "top album", determination module 135 may be constrained to reply with the top ten albums on the music chart, rather than just the top album, or may be constrained to reply with only the top artist on the album, and so forth. Alternatively, if requesting computer system 100 has required (i.e., "mustUnderstand='true'") that only the top album be returned, but determination module 135 is constrained to give out the top ten albums, then determination module 135 may return an empty message, or an error, or the like. As such, there are a wide variety of ways and implementations in which responding computer system 105 can be configured to reply to requesting computer system 100.

In any event, FIG. 1 shows that, after any such determination is made, web service 130 then constructs a SOAP response message 145 that relates to SOAP get message 115. In particular, SOAP response message 145 includes the message ID in a "RelatesTo" element of the SOAP envelope of the SOAP response message 145. For example, with reference to the prior SOAP envelope described above, a portion of a SOAP envelope in a response message 145 that included a reference to the message ID might appear in a SOAP header as follows.

computer system 105 includes a tag in the SOAP header of response message 145 as follows.

<etag:ETag>VG9ueQ==</etag:ETag>

This token element can then be used by requesting computer system 100 in a subsequent request message (not shown) to check for updates. The corresponding response message (not shown) would also include the token value (e.g., "VG9ueQ"), and any information related to a content update, if available.

This approach could also be used to incorporate derived information for encryption purposes, or for signing messages, and so on. In particular, any "content computed" type of information can be added in SOAP get 115 with the appropriate tags or elements. Accordingly, one will appreciate in view of these and other examples that the SOAP get message 115 is highly extensible for any number of suitable purposes, and provides such extensibility within the benefits of transport protocol independence.

In any event, once SOAP response message 145 has been prepared, FIG. 1 shows that responding computer system 105 can then send message 145 through any appropriate transport protocol 120. In particular, web service application 130 forwards message 145 through an appropriate transport protocol 120, and ultimately onto network 125. As in the sending case, one or more intermediate nodes of network 125 resolve any

```
<s:Envelope
    xmlns:s="http://www.w3.org/year/month/soap-envelope"
    xmlns:music="http://music.example.com"
    xmlns:wsa="http://schemas.xmlsoap.org/ws/year/month/addressing" >
    <s:Header>
        <wsa:Action>
        http://schemas.xmlsoap.org/ws/year/month/get/Get/Response
        </wsa:Action>
        <wsa:RelatesTo>
        uuid:4a1f6794-ca60-4020-ae49-a326d27497ed
        </wsa:RelatesTo>
        <wsa:To>
        http://schemas.xmlsoap.org/ws/year/month/addressing/role/
        anonymous
        </wsa:To>
    </s:Header>
```

The remainder of the SOAP envelope in response message 145, which indicates the content of the request, and any other appropriate parameters, might appear as follows.

```
    <s:Body>
        <music:album>
            <music:title>Songs by Artist</music:title>
            <music:link>
            http://beta.music.example.com/album/?album=12345678
            </music:link>
            <music:description xml:lang="en-US" >
            Songs by Artist
            </music:description>
            <music:pubDate>Date and Time Values</music:pubDate>
            <music:category>GenreY</music:category>
        </music:album>
    </s:Body>
</s:Envelope>
```

In some cases, SOAP response message 145 can also include one or more tokens (not shown) or "validators", which can be used by requesting computer system 100 to check for subsequent changes (or updates) to the requested content. For example, in one implementation, responding EPRs (or any other URIs), and pass response message 145 back to requesting computer system 100. In particular, requesting computer system 100 then receives message 145 through an appropriate transport protocol 120, and processes the corresponding content.

Figure 2:
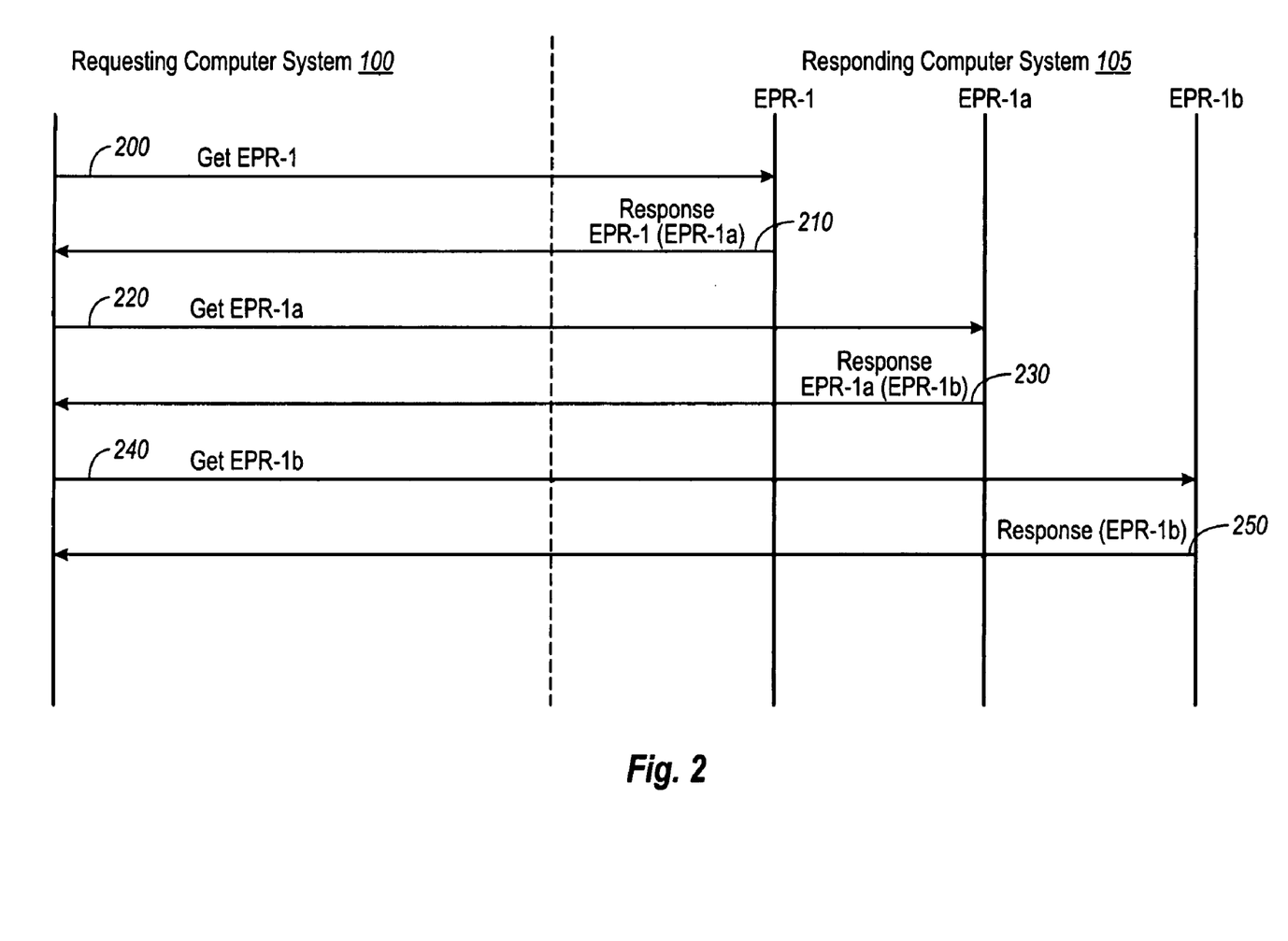
FIG. 2 illustrates a schematic diagram in accordance with an implementation of the present invention in which a responding computer system provides the contents of a request by providing multiple portions of the requested content via multiple endpoint references.

FIG. 2 illustrates another schematic diagram in accordance with an implementation of the present invention where responding computer system 105 does not give out all content requested by requesting computer system 100 in a single message. In particular, FIG. 2 shows that requesting computer system 100 prepares a SOAP get message 200 that is addressed to "EPR-1", and sends message 200 to responding computer system 105, much like get message 115 in FIG. 1. For example, a user (or application 110) is interested in all photographs taken by the Hubble Space Telescope. In contrast with FIG. 1, however, when responding computer system 105 receives message 200, determination module 135 determines that not all of the requested content in message 200 should be provided in a single response.

For example determination module 135 might determine that there are too many available Hubble Space Telescope photos to deliver in a single response, and that, for a variety of processing or bandwidth concerns, the photos should be provided iteratively. Upon receiving SOAP get 200, determination module 135 recognizes that the requested contents (e.g., "all photos by Hubble") may be too large to provide in a single message. Alternatively, responding computer system 105 may be overloaded with other requests, or, for other bandwidth or some other resource concerns, may have other reasons to deliver a response through iterative messages. As such, determination module 135 (or any other appropriate module or component) can divide the requested content into several manageable portions. Each portion is also assigned a separate endpoint reference, such as "EPR-1$a$", "EPR-1$a$1$b$" shown in FIG. 2.

Each outgoing response message for each portion of content, in turn, contains an endpoint reference for the next set of provided content. (This contrasts at least in part with conventional HTTP Get since a typical response to a conventional HTTP Get message does not allow for including a URI for the rest of the content. That is, the specific means to select additional content using an HTTP Get form of requests and responses is not fundamentally extensible.) Each outgoing response message can also include any necessary instructions, such as specific headers or tags that requesting computer system 100 should use in the body of the next SOAP get message (i.e., message 220). The endpoint references and instructions are then used by a requesting computer system to create corresponding iterative SOAP get messages.

Accordingly, FIG. 2 shows that responding computer system 105 receives SOAP get message 200, and replies with SOAP response 210, which relates to message 200. Response message 210 also includes at least a portion of the requested content, and another endpoint reference "EPR-1$a$", which indicates where requesting computer system 100 can get the remaining portions of requested content. Of course, SOAP response 210 can also simply include none of the content, and only a reference to where the requested content can be found. As such, one will appreciate that FIG. 2 is simply one illustration of a variety of ways in which responding computer system 105 can configure iterative response messages for requesting computer system 100.

FIG. 2 also shows that requesting computer system 100 receives SOAP response message 210, and processes the contents accordingly. As part of the processing, requesting computer system 100 creates new SOAP get message 220, which is addressed to "EPR-1$a$"—the endpoint reference provided in message 210. Requesting computer system 100 then sends SOAP get message 220 to responding computer system 105. Responding computer system 105 then prepares another SOAP response message 230, which includes the requested content from "EPR-1$a$", a reference to the next set of content at "EPR-1$b$", and/or any other corresponding instructions. Responding computer system 105 then sends SOAP response 230 to requesting computer system 100.

Upon receiving SOAP response 230, requesting computer system 100 processes the requested contents, and creates new SOAP get message 240, which is addressed to "EPR-1$b$"—the endpoint reference provided in message 230. Responding computer system 105 then prepares another SOAP response message 250, which includes the requested content from "EPR-1$b$", and, if appropriate, provides no other instructions. Requesting computer system 100 then accepts SOAP response 250, and processes the content as necessary.

The foregoing example of EPR usage can be applied to any data store, or to any application maintaining data in a store, where the responding computer system might find an efficiency gain in replying to a request through iterative response messages. Furthermore, one will appreciate that the nature or format of each individual, iterative response, can be based on a separately determined policy based on any number of present concerns for the responding computer system. Thus, in the context of one data transmission session, several alternative data transfer policies can be expressed as part of the EPRs being exchanged.

Figure 3:
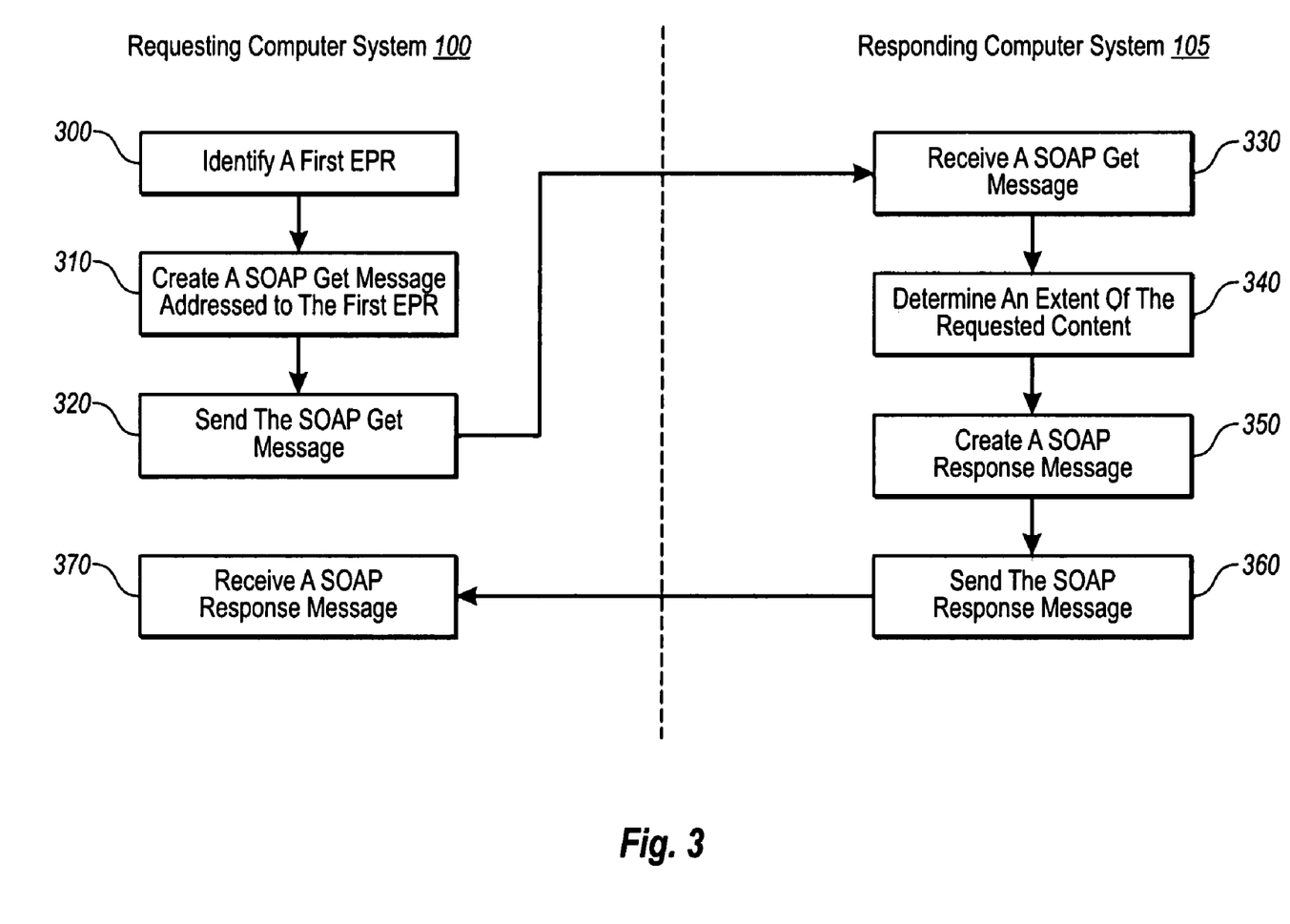
FIG. 3 illustrates a flow chart of a method from the requesting computer system and from the responding computer system perspective for exchanging information in accordance with an implementation of the present invention.

Accordingly, the schema of FIGS. 1 and 2 provide a number of extensible ways in which content can be exchanged or retrieved between requesting and responding computer systems using protocol-independent, highly interoperable mechanisms. The present invention can also be described in terms of acts of a method for accomplishing one or more functions or results. In particular, FIG. 3 illustrates methods from the requesting computer system 100 perspective and from the responding computer system 105 perspective for exchanging information in a configurable fashion. The acts of FIG. 3 are described below with reference to the preceding figures.

For example, a method from the requesting computer system 100 perspective comprises an act 300 of identifying a first EPR. Act 300 includes identifying a first endpoint reference for content to be retrieved from a responding computer system. For example, requesting computer system 100 identifies that certain content, such as one or more photos, attributes about a musical artist, or any other type of content, is available at an endpoint reference in a SOAP message. The endpoint reference typically includes a URI to content of a file, such as a file in content store 140 at responding computer system 105.

The method from the requesting computer system 100 perspective also comprises an act 310 of creating a SOAP get message addressed to the first EPR. Act 310 includes creating a SOAP get message that is addressed to the first endpoint reference with a SOAP header, the SOAP get message including a message identifier, a request for the content, and one or more parameters for the requested content. For example, SOAP get message 115 creates SOAP get message 115, which includes a specific message identifier that uniquely identifies message 115, and can help correlate subsequent response messages. Requesting computer system 100 also includes in the created SOAP get message with a SOAP header for an endpoint reference element. The endpoint reference element can contain additional SOAP headers and elements for appropriate parameters that can be used to modify the SOAP get, or to modify the retrieval of contents. For example, a SOAP get message may include one SOAP envelope headers, or one or more fields in the endpoint reference header that relate to the "top album" of a specific music chart at an online music store.

The method from the requesting computer perspective also comprises an act 320 of sending the SOAP get message. Act 320 includes sending the SOAP get message to the responding computer system through a first transport. For example, a client application 110 forwards message 115 to any appropriate transport protocol 120 onto a network, where one or more intermediate nodes resolve the first endpoint reference to a file at responding computer system 105.

Accordingly, the method from the perspective of responding computer system 105 comprises an act 330 of receiving a SOAP get message. Act 330 includes receiving a SOAP get message that is addressed to a first endpoint reference with a SOAP header, the SOAP get message including a message identifier, content to be retrieved, and one or more parameters for the requested content to be retrieved. For example, responding computer system receives SOAP get message 115. Responding computer system 105 also identifies the content addressed by endpoint reference that is defined by a corresponding SOAP header, having a URI header field addressed to "EPR-1". For example, FIG. 1 shows that the contents of EPR-1 may be found in a local content store (e.g., "content store 140").

The method from the responding computer system 105 perspective also comprises an act 340 of determining an extent of the requested content. Act 340 includes determining an extent of the requested content to provide to the requesting computer system. For example, determination module 135 identifies that the requested content of SOAP get message 115 can be fulfilled in a single response. Alternatively, determination module 135 identifies that a larger request (e.g., SOAP get message 200) is too large to be filled in one response, and should be fulfilled iteratively. Determination module 135 (or another appropriate module or component) can then divide or prioritize the requested content into multiple, identifiable data chunks that are each assigned to corresponding, multiple unique EPRs.

As previously described herein, determination module 135 can also be constrained by other parameters, whether subject to constraints at responding computer system 105, or subject to parameters included in the received SOAP get message. For example, the extent of content that can be provided by determination module 135 may depend on such parameters as a number of elements that can be returned, conditions on data "freshness" or updates, an absolute size of the content to return, and so on. Yet still other conditions for constraining a response can relate to whether the content is appropriate, or whether only certain sub-elements of the requested content can be provided in lieu of the actual request. As such, there is a high degree of configurability for what is requested, and to how requests can be responded.

In any event, FIG. 3 also shows that the method from the responding computer system 105 perspective comprises an act 350 of creating a SOAP response message. Act 350 includes creating a SOAP response message that relates to the message identifier of the SOAP get message. For example, responding computer system 105 creates SOAP response message 145, which includes the requested content subject to any parameters or constraints, as well as a "RelatesTo" field in the SOAP envelope that identifies the first identifier "message ID" of SOAP get message 115. Responding computer system 105 can also include in SOAP response message 145 (or SOAP response 210, or 230, etc.) any tokens, additional endpoint references, or other information that can be used in subsequent SOAP get messages for content updates, or for accessing additional portions of content, and so forth.

In addition, FIG. 3 shows that the method from the responding computer system 105 perspective comprises an act 360 of sending the SOAP response message. Act 360 includes sending to the requesting computer system the SOAP response message through a first transport protocol. For example, responding computer system 105 sends SOAP response message 145 from a web service application 130 through any appropriate transport protocol 120, onto a network 125, and ultimately to requesting computer system 100. For example, FIG. 1 shows that transport protocol 120 used by responding computer system 105 with SOAP response message 145 is identical to transport protocol 120 used initial by requesting computer system with SOAP get message 115. This is not, however, required. In particular, both sending and responding computer systems may be using different transport protocols, since implementations of the present invention are typically transport-neutral.

FIG. 3 also shows that the method from the requesting computer system 100 perspective comprises an act 370 of receiving a SOAP response message. Act 370 includes receiving from the responding computer system a SOAP response message that relates to the message identifier of the SOAP get message, the SOAP response message being received through a second transport protocol. For example, SOAP response 145 includes a "RelatesTo" field that indicates it is a response to SOAP get message 115. Furthermore, SOAP response 145 is received through any appropriate transport protocol, which may be identical to, or different from, the transport protocol used to send the SOAP get message. The transport protocol may also be the same as, or different from, the transport protocol used by the responding computer system to send the SOAP response message.

In addition, the received response message may or may not contain the requested content, and also may only contain only a portion of the requested content. For example, the SOAP response message (e.g., 145) may contain the identification of the "top album" sold on a specific music chart. Alternatively, the SOAP response message may simply be empty, or contain an error message, such as when constraints at both the requesting and responding computer systems do not overlap, and thus forbid a return of the requested content. In other cases, SOAP response message (e.g., 210) may include an extent of content deemed appropriate by determination module 135, and may also include an identification of a next endpoint reference to additional content. The requesting computer system then processes the received SOAP response message as appropriate.

Accordingly, the schemas and methods described herein, therefore, provide requesting and responding computer systems with the ability to implement "Get" functionality in a much more extensible request/response manner than otherwise possible. In particular, requesting computer systems can request content available at an endpoint reference in accordance with one or more parameters, without otherwise involving the use of inordinately long and/or complex URIs. Furthermore, responding computer systems can respond to content requests in similarly configurable ways as deemed appropriate for the responding computer system. Thus, a number of implementations of the present invention provide a high degree of efficiency and flexibility in network-based information exchange.

Figure 4:
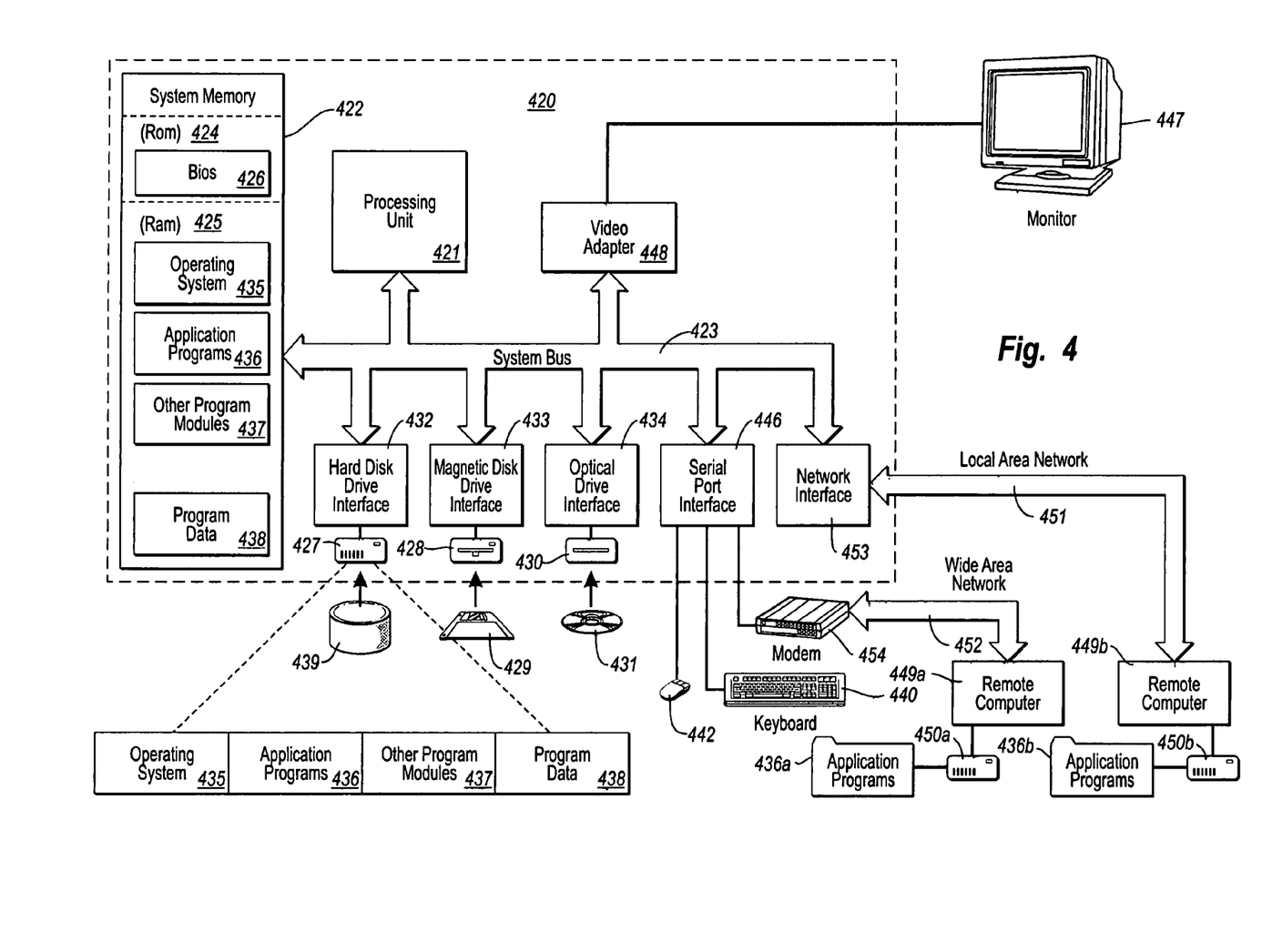
FIG. 4 illustrates a schematic diagram of a suitable computing environment for practicing one or more implementations of the present invention.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network.

In a distributed computing environment, program modules may be located in both local and remote memory storage devices.

With reference to FIG. 4, an exemplary system for implementing the invention includes a general-purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disc drive 428 for reading from or writing to a removable magnetic disk 429, and an optical disc drive 430 for reading from or writing to removable optical disc 431 such as a CD ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. At a requesting computer system in a computerized environment in which the requesting computer and a responding computer system exchange information over a network, a method of retrieving information from the responding computer in a transport neutral way, such that the information exchanged between the requesting computer system and the responding computer system is configurable, comprising the acts of:

identifying a first endpoint reference for content to be retrieved from a responding computer system;

creating a SOAP get message that is addressed to the first endpoint reference with a SOAP header, the SOAP get message including a message identifier, a request for the content, and one or more parameters for receiving the content;

sending the SOAP get message to the responding computer system through a first transport protocol; and receiving from the responding computer system a SOAP response message that relates to the message identifier of the SOAP get message, the SOAP response message being received through a second transport protocol.

2. The method as recited in claim 1, wherein the first transport protocol and the second transport protocol are the same transport protocol.

3. The method as recited in claim 1, wherein the SOAP header of the endpoint reference comprises a URI element, and one or more parameter elements in the SOAP message that regard how the content identified through the endpoint reference is to be accessed.

4. The method as recited in claim 1, wherein the one or more parameter elements in the SOAP message identify one or more portions of the content that are to be accessed.

5. The method as recited in claim 1, wherein the one or more parameters refer to one or more of a maximum size of content returned in the SOAP response message, a maximum number of elements to be included in the SOAP response message, and a maximum number of elements to be included in all SOAP response messages of a specific connection with the responding computer system.

6. The method as recited in claim 1, wherein the one or more parameters refer to one or more characteristics of content elements to be returned in the SOAP response message, the one or more parameters including at least one of filtering information and projection information.

7. The method as recited in claim 1, further comprising creating a new SOAP get message in response to the SOAP response message, the new SOAP get message including a new message identifier that is different from the first message identifier.

8. The method as recited in claim 7, wherein the SOAP response message comprises at least a portion of the requested content.

9. The method as recited in claim 7, wherein the SOAP response message comprises a second endpoint reference that identifies a next portion of the requested content.

10. The method as recited in claim 9, wherein the new SOAP get message is addressed to the second endpoint reference, the new SOAP get message including a request for the next portion of the requested content.

11. The method as recited in claim 10, further comprising receiving a different SOAP response message that relates to the second identifier, the different SOAP response message including the next portion of requested content that was identified by the second endpoint reference.

12. The method as recited in claim 7, wherein the response message includes a token that is to be used by the requesting computer system in a subsequent SOAP Get message, such that the new SOAP get message includes the token provided by the responding computer system, and a request for an update of the requested content.

13. The method as recited in claim 12, wherein the new SOAP message includes a requirement that the responding computer system must understand the request for the update of requested content.

14. At a responding computer system in a computerized environment in which a requesting computer and the responding computer system exchange information over a network, a method for providing information to the requesting computer in a transport neutral way, such that the information exchanged between the requesting computer system and the responding computer system is configurable, comprising the acts of:
    receiving a SOAP get message that is addressed to a first endpoint reference with a SOAP header, the SOAP get message including a message identifier, content to be retrieved, and one or more parameters for the requested content to be retrieved;
    determining an extent of the requested content to provide to the requesting computer system;
    creating a SOAP response message that relates to the message identifier of the SOAP get message; and
    sending to the requesting computer system the SOAP response message through a first transport protocol.

15. The method as recited in claim 14, wherein determining an extent of the requested content comprises evaluating at least one of the one or more parameters of the SOAP get message, an amount of the requested content that is available, an amount of resources available for processing the SOAP get message, and an available network connection bandwidth for providing the requested content.

16. The method as recited in claim 14, wherein the responding computer system determines that the requested content is to be handled with multiple SOAP response messages, the method further comprising assigning the first endpoint reference to one portion of the requested content, and assigning a second endpoint reference to a next portion of the requested content.

17. The method as recited in claim 16, wherein the SOAP response message includes an identification of the second endpoint reference, the method further comprising receiving a new SOAP get message that is addressed to the second endpoint reference, the new SOAP get message being received through a second transport protocol.

18. The method as recited in claim 17, further comprising sending to the requesting computer system the requested next portion of content that is assigned to the second endpoint reference.

19. The method as recited in claim 17, wherein the first transport protocol is different from the second transport protocol.

20. At a requesting computer system in a computerized environment in which the requesting computer and a responding computer system exchange information over a network, a computer program product having computer-executable instructions stored thereon that, when executed, cause one or more processors at the requesting computer system to perform a method of retrieving information from the responding computer in a transport neutral way, such that the information exchanged between the requesting computer system and the responding computer system is configurable, comprising the following:
    identifying a first endpoint reference for content to be retrieved from a responding computer system;
    creating a SOAP get message that is addressed to the first endpoint reference with a SOAP header, the SOAP get message including a message identifier, a request for the content, and one or more parameters for receiving the content;
    sending the SOAP get message to the responding computer system through a first transport protocol; and
    receiving from the responding computer system a SOAP response message that relates to the message identifier of the SOAP get message, the SOAP response message being received through a second transport protocol.

* * * * *